US009382595B2

(12) United States Patent
Dubé

(10) Patent No.: US 9,382,595 B2
(45) Date of Patent: Jul. 5, 2016

(54) METHOD FOR THE PRODUCTION AND THE PURIFICATION OF MOLTEN CALCIUM ALUMINATE USING CONTAMINATED ALUMINUM DROSS RESIDUE

(71) Applicant: 9255-8444 QUEBEC INC., Saguenay (CA)

(72) Inventor: Ghyslain Dubé, Saguenay (CA)

(73) Assignee: 9253-8444 QUEBEC INC., Saguenay, Quebec (CA)

(*) Notice: Subject to any disclaimer, the term of this patent is extended or adjusted under 35 U.S.C. 154(b) by 352 days.

(21) Appl. No.: 14/177,305

(22) Filed: Feb. 11, 2014

(65) Prior Publication Data
US 2014/0224069 A1 Aug. 14, 2014

Related U.S. Application Data

(60) Provisional application No. 61/763,532, filed on Feb. 12, 2013.

(51) Int. Cl.
C01B 33/24 (2006.01)
C21C 7/04 (2006.01)
C21C 1/06 (2006.01)
C21C 7/00 (2006.01)
C22B 7/04 (2006.01)
C21C 1/02 (2006.01)
(Continued)

(52) U.S. Cl.
CPC . *C21C 7/00* (2013.01); *C21C 1/025* (2013.01); *C21C 7/0645* (2013.01); *C21C 7/076* (2013.01); *C22B 7/04* (2013.01); *C21C 7/0075* (2013.01); *C21C 7/0087* (2013.01); *Y02P 10/218* (2015.11); *Y02P 10/242* (2015.11)

(58) Field of Classification Search
CPC ....... Y02P 10/242; Y02P 10/218; C21C 7/00; C21C 7/0075; C21C 7/0645; C21C 1/025; C21C 7/076; C21C 7/0087; C22B 7/001; C22B 7/04
USPC ................. 75/570, 329, 433, 330; 423/331
See application file for complete search history.

(56) References Cited

U.S. PATENT DOCUMENTS 3,999,980 A   12/1976  Montagna
4,959,100 A    9/1990  Dube et al.
(Continued)

OTHER PUBLICATIONS

Breault R. et al. "Aluminum Plasma Dross Treatment Process and Calcium Aluminate Production: Closing the Loop With no Residue", Fourth International Symposium on Recycling of Metals and Engineered Materials, Ed. by D.L. Stewart, Jr., J.C. Daley and R.L. Stephens, pp. 1183-1194.
(Continued)

*Primary Examiner* — Colleen Dunn
*Assistant Examiner* — Haytham Soliman
(74) *Attorney, Agent, or Firm* — Sutherland Asbill & Brennan LLP

(57) ABSTRACT

The present invention provides a process for the preparation of pre-melted calcium aluminate for iron and steel treatment and protection by the fusion of aluminum dross residues, usually referred to as non-metallic products (NMP) containing variable levels of aluminum (Al) and aluminum nitride (AlN) with calcium carbonate at high temperature, under oxidizing atmosphere. It further relates to the purification of the molten calcium aluminate from some contaminants present in the dross residue.

22 Claims, 3 Drawing Sheets

(51) Int. Cl.
  *C21C 7/064* (2006.01)
  *C21C 7/076* (2006.01)

(56) References Cited

U.S. PATENT DOCUMENTS

| | | |
|---|---|---|
| 4,997,476 A | 3/1991 | Lindsay et al. |
| 5,135,565 A | 8/1992 | Gens |
| 5,227,143 A | 7/1993 | Stewart, Jr. et al. |
| 5,245,627 A | 9/1993 | Drouet |
| 5,385,601 A | 1/1995 | Kemeny et al. |
| 5,407,459 A | 4/1995 | Breault et al. |
| 5,470,376 A | 11/1995 | Dube et al. |
| 5,716,426 A | 2/1998 | Beelen et al. |
| 6,238,633 B1 | 5/2001 | Pickens et al. |
| 2011/0293494 A1 | 12/2011 | Martinez Iglesias et al. |

OTHER PUBLICATIONS

Heberlein J. and Murphy A.B., 2008, "Thermal plasma waste treatment", Journal of Physics D: Applied Physics, No. 41, pp. 1-20.

METHOD FOR THE PRODUCTION AND THE PURIFICATION OF MOLTEN CALCIUM ALUMINATE USING CONTAMINATED ALUMINUM DROSS RESIDUE

CROSS-REFERENCE TO RELATED APPLICATIONS

This application claims the benefit of U.S. Provisional Application No. 61/763,532, filed Feb. 12, 2013, which is incorporated herein by reference in its entirety.

BACKGROUND OF THE INVENTION

1. Field of the Invention

This invention relates to a process for the preparation of pre-melted calcium aluminate for iron and steel treatment and protection by the fusion of aluminum dross residues, usually referred to as non-metallic products (NMP) containing variable levels of aluminum (Al) and aluminum nitride (AlN) with calcium carbonate at high temperature, particularly superior to 1400° C., under oxidizing atmosphere such as air and/or $CO_2$. It further relates to the purification of the molten calcium aluminate from some contaminants present in the dross residue.

2. Description of the Prior Art

Aluminum dross is formed whenever aluminum or aluminum alloy is melted and held in the liquid state, during alloying and refining treatment processes and casting under oxidizing atmosphere. Aluminum dross is also formed in larger quantities during the remelting of process scrap and the recycling of post-consumer aluminum products.

Dross must be removed from the liquid surface before casting and rapidly cooled to prevent further oxidation of the aluminum, using various techniques well known by the experts in the field.

The removed dross contains large quantities of metallic aluminum, intimately mixed with oxides of various natures, mainly alumina, magnesia in isolated or combined form such as spinel, $MgAl_2O_4$, and with other smaller quantities of various oxides depending on the type of alloys, such as oxides of iron, silicon, manganese, titanium, vanadium, copper, chromium, etc.

Aluminum dross, particularly when originating from the primary operations also contains others impurities such as chlorides and fluorides salts of mixed sodium, potassium, lithium, calcium and/or aluminum composition, originating from the electrolytic reduction and the cast house refining processes. These salts are either carried over from the reduction cells, or formed in the casting furnaces during the refining operations, where they are collected with the aluminum dross during the skimming process.

Since the metallic aluminum content of the dross represents a substantial economic value, it is desirable to recover the maximum possible aluminum content from the dross. The residue left after the aluminum separation from the dross is a mixture of Non Metallic Products, called NMP, consisting essentially of aluminum oxide and nitride with variable quantities of other oxides, chloride and fluoride salts of alkaline and alkaline earth metals and variable residual content of metallic aluminum.

Several processes have been developed to recover the aluminum from dross. For example, dross treatment using various electrical technologies using direct or indirect plasma arc or resistance heating have been proposed, such as described by Dubé et al, U.S. Pat. Nos. 4,959,100 and 5,997,476; Drouet, U.S. Pat. No. 5,245,627; Lindsay, U.S. Pat. No. 4,997,476; or Montagna, U.S. Pat. No. 3,999,980.

Alternatively, the recovery of aluminum metal from solid dross using oxy-fuel heated rotary furnaces or converters in the absence of salt, such as the method described in the U.S. Pat. No. 5,527,380 have also been proposed for achieving an efficient aluminum recovery. For this reason, the NMP generated by these salt-free technologies are relatively clean from salts. The NOVAL non-metallic product from the plasma process (appellation by ALCAN, described in: *Recycling of Metals and Engineered Materials*, TMS, pp. 1,183, (2000) has been extensively utilized. Because NOVAL-type NMP contain variable level of reactive residual Al and AlN, its energy content is very high, in the order of 4,500 kJ/kg, which makes it particularly well suited for utilization in a high temperature process application.

However, most of the dross in the aluminum industry is being generated by the secondary melting operations and by the recycling of post-consumer scrap, such as used beverage cans. Most of these recycling technologies rely on the utilization of salt flux in order to obtain a high aluminum recovery. Also, primary dross is still often processed using these salt based processes, even if this type of dross contains no or very small quantity of salt. Formerly, the residues obtained from these salt based processes, which are in reality a mixture of salt slag and NMP were disposed of in landfill as waste. Such disposal is increasingly facing environmental restriction or is even banned in a large number of countries. Technologies are under development to separate and reuse the salts from these salty residues using water leaching based processes, such as described in U.S. Pat. No. 5,227,143. Under these conditions the water leached NMP obtained have much lower energy content due to their low Al and AlN content. In some cases, their residual salt level is still high due to the presence of water insoluble salts such as fluoride compounds that are always present at variable concentrations in the smelter dross. For this reason, their reutilization must take this into account. The NMP marketed under the commercial name SEROX, by the firm ALSA (Aluminium-Salzschlacke Aufbereitungs GmbH, Lunen, Germany) falls in this category.

In addition to its utilization in high temperature refractory and concrete industry, basic synthetic calcium aluminate product is extensively used in the iron and steel industries for different metallurgical applications, such as sulfur removal and slag modification and control for ladle metallurgy operations. A key feature highly required by the steel metallurgists is the slag's ability to melt readily in contact with the liquid steel. It is now fully recognized that dense, completely pre-melted calcium aluminate products offer significant advantages in this respect, compared with more porous sintered product material produced by solid state sintering by holding under the melting range of the product, in the range of 1200-1300° C., as opposed to a pre-melted product which is produced by completely melting the product in a large furnace, at temperature above 1400-1500° C. In addition, pre-melted products are much more chemically and physically stable, with low LOI and higher density and less dusty than the sintered material.

The composition of the calcium aluminate desired by the steel metallurgists depends on the specific utilization conditions, but is usually close to the 50/50 mass ratio of alumina to calcium oxide, corresponding to the mayenite main phase $Ca_{12}Al_{14}O_{33}$, with an eutectic temperature of about 1375° C.

Pre-molten calcium aluminate is normally prepared by the fusion of high quality bauxite, low in Fe, Si, Ti, and V, with lime in large electric arc furnace. Due to the high costs of the raw material and energy, this product is expensive, and its utilization is normally restricted for special applications in high quality concrete and ceramic applications. For this reason, there is a need to prepare calcium aluminate of high purity, in large volume and at lower costs than presently available for utilization by the steel industry.

The review of the prior art in this field reveals a few attempts to fill this need, which to our knowledge have not been successfully transferred to industrial scale for cost and quality reasons which follow. Most of these processes, such as Breault et al, U.S. Pat. No. 5,407,459 produce sintered calcium aluminate by heating a mix of NMP and limestone below the melting temperature of the calcium aluminate in a large rotary kiln, heated by fossil fuel. As explained by the authors, the significant energy released from the oxidation of the Al and AlN present in variable quantity in the NMP makes the control of the sintering temperature zone close to the melting zone very critical.

In another similar invention, Pickens et al, U.S. Pat. No. 6,238,633, the dross residue was digested in water in order to decompose its Al and AlN content before sintering a mixture of the residues with calcium oxide precursor at temperature below the melting range of the calcium aluminate. The process was reported to be easier to control to avoid the formation of calcium aluminate agglomerate. However; the energy content of the Al and AlN was lost.

More recently, J.M. Iglesias (US 2011/0293494A1) proposed another similar process to generate solid calcium aluminate from the waste generated by the treatment of secondary saline dross through cold sintering or hot sintering between 1100 and 1400° C.

In addition to the fact that these solid state processes produce sintered calcium aluminate which is considered a low grade product for the steel application, they also produce calcium aluminate material which is contaminated by the residual oxides present in the NMP, such as $SiO_2$, $Fe_2O_3$, $TiO_2$, $V_2O_5$, $MnO$, $Cr_2O_3$, etc. that are known to be detrimental to the steel metallurgy by increasing the slag oxygen potential and/or the risk of steel contamination. As demonstrated by U.S. Pat. No. 6,238,633 this severely limits the type and quantity of NMP that can be utilized to produce the calcium aluminate.

Gens (U.S. Pat. No. 5,135,565) and Kemeny et al (U.S. Pat. No. 5,385,601) describe another approach both using transferred arc plasma device operating under inert gas cover to recover the aluminum content of the dross, not the residue, while producing a liquid slag containing calcium aluminate with a very high level of silica (15%). The slag obtained by Gens contained on the other hand a very high level (8%) of mixed salts (NaCl—KCl) with low levels of calcium aluminate (89-90%). In both cases, the level of impurities in the calcium aluminate is too high to be of any use for the steel industry. This can be explained because these two processes have been primarily designed for recovering the aluminum content of the dross, which dictates severe restrictions on the composition of the liquid fluxes.

In U.S. Pat. No. 5,716,426, Belen et al. describe a method to process aluminum dross and aluminum dross residue, essentially free of NaCl and KCl with lime at a temperature below 1600° C. to form at least partly melted calcium aluminate. The separation of the aluminum from the dross can be performed in the same vessel used to react the dross residue with the calcium oxygen compound. In addition to the limitations described above, particularly the fact that the dross residue must be essentially free from NaCl—KCl salts, these processes were verified to be ineffective in producing good quality, environmentally safe calcium aluminate products using contaminated NMP as confirmed by our own experiments described under Example 1.

For all these reasons, the production of high quality, completely pre-melted calcium aluminate using contaminated dross residue as a precursor of alumina is not presently possible at acceptable costs.

Accordingly, there is a real need in the aluminum and steel industries for a novel approach to produce high quality pre-melted calcium aluminate using contaminated NMP, in an environmentally responsible and cost effective manner.

SUMMARY OF THE INVENTION

In accordance with the present invention, there is now provided a novel process for the direct conversion of non-metallic aluminum dross residue into a pre-melted calcium aluminate product using the addition of calcium carbonate at high temperature using electrical means and under oxidizing atmosphere.

In accordance with a first aspect, there is provided a process for the conversion of a non-metallic aluminum dross residue containing variable level of aluminum (Al) and aluminum nitride (AlN) contaminated by alkali halide salts, sulfur products and heavy metal oxides, into a purified pre-melted calcium aluminate product, the process comprising the steps of:
a) mixing said dross residue with a calcium carbonate compound to produce a mixture;
b) heating said mixture, above a melting temperature of calcium aluminate in a furnace, and maintaining in liquid state to achieve the following:
   i) oxidation of said Al and AlN present in said dross residue and reaction with any free CaO to form a calcium aluminate product;
   ii) evaporation of volatile alkali halide salts and sulfur products;
c) discharging said purified liquid calcium aluminate outside said furnace; and
d) letting said liquid calcium aluminate solidify to achieve a purified calcium aluminate product, essentially free from alkali halide salts, sulfur products and heavy metal oxides.

The pre-melted calcium aluminate material produced under these conditions has been shown to be stable, inert, non-dusty and environmentally benign according to various EPA leaching tests for metals and fluorides, and highly suitable for various iron and steel treatment and protection applications.

DESCRIPTION OF THE INVENTION

Abbreviations

A: $Al_2O_3$; C:CaO; EPA: Environmental Protection Agency (US); LOI: loss on ignition; NMP: non-metallic products; TCLP: Toxicity Characteristic Leaching Procedure; XRD: X-ray diffraction; XRF: X-ray fluorescence.

Definitions

The term "about" as used herein refers to a margin of + or −10% of the number indicated. For sake of precision, the term "about" when used in conjunction with, for example: 90% means 90% +/−9% i.e. from 81% to 99%. More precisely, the term "about" refer to + or −5% of the number indicated, where for example: about 90% means 90% +/−4.5% i.e. from 86.5% to 94.5%.

As used herein the singular forms "a", "an", and "the" include plural referents unless the context clearly dictates otherwise. Thus, for example, reference to "a liquid alloy" includes a plurality of such alloys and reference to "the product" includes reference to one or more product and equivalents thereof known to those skilled in the art, and so forth. All technical and scientific terms used herein have the same meaning as commonly understood to one of ordinary skill in the art to which this invention belongs unless clearly indicated otherwise.

As used herein, the term "purified" means: at least 90%, for example, 90% or 91% or 92% or 93% or 94% or 95% or 96% or 97% or 98% or 99% or 99.5% or 99.6% or 99.8% or 99.9% or 100% pure.

The terms "essentially" such as in "essentially free from" mean less than: 10% or 9% or 8% or 7% or 6% or 5% or 4% or 3% or 2% or 1% or 0.5% contaminants.

The terms "significant" or "significantly" such as in "significant reduction" mean reduction of about 48% or about 50% or about 60% or about 70% or about 80% or about 90% or greater.

The term "substantially" as used herein means more than 95% or more than 96% or more than 97% or more than 98% or more than 99%.

The term "complete" as used herein means about 100%.

The term "enriched" as used herein means enriched by at least about 50% or by about 60% or by about 75% or by about 85%.

DETAILED DESCRIPTION OF PARTICULAR EMBODIMENTS

Figure 1:
FIG. 1 shows the addition of NMP and limestone mixture in the electric transferred arc furnace.
Figure 2:
FIG. 2 shows the melting process.
Figure 3:
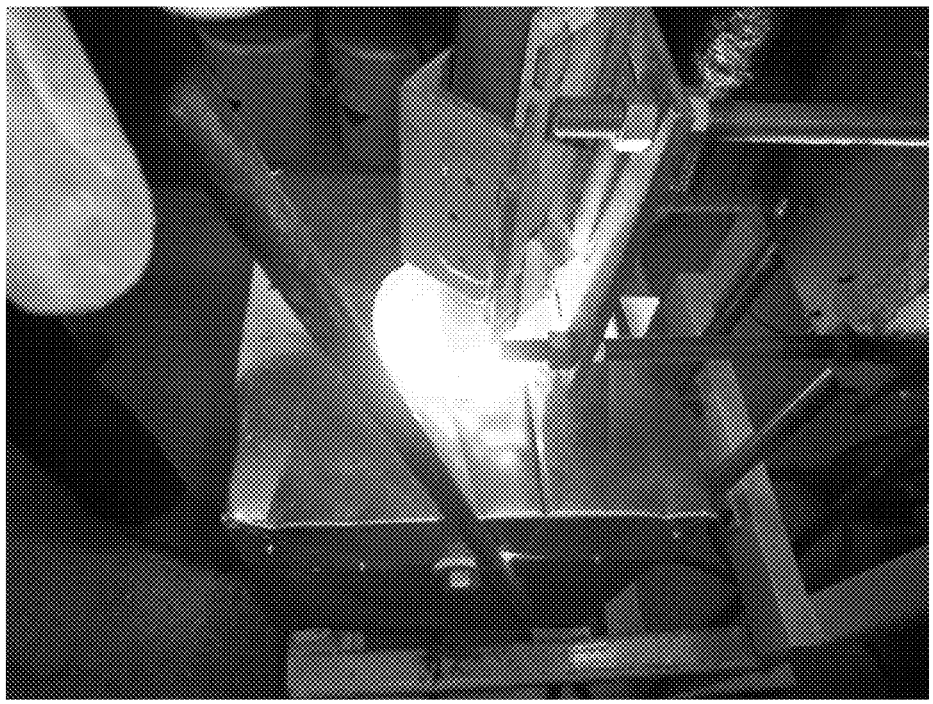
FIG. 3 shows the liquid calcium aluminate product at temperature of about 1600° C.
Figure 4:
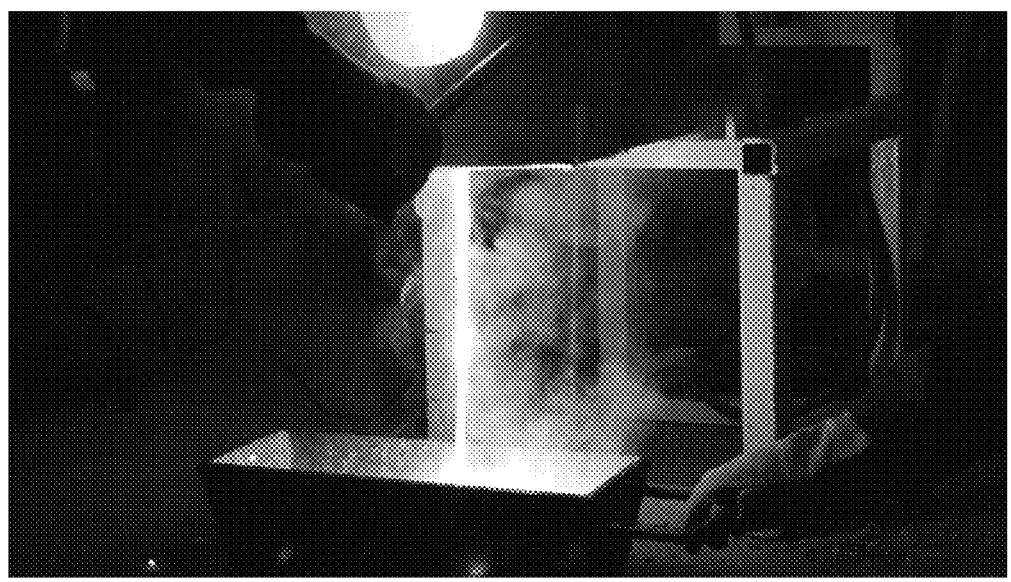
FIG. 4 shows the pouring of the liquid calcium aluminate in a steel mold by tilting the furnace.

In accordance with a particular aspect of the invention, there is provided a process for the conversion of a non-metallic aluminum dross residue containing variable level of aluminum (Al) and aluminum nitride (AlN) contaminated by alkali halide salts and/or sulfur products and/or heavy metal oxides, into a substantially purified pre-melted calcium aluminate product, the process comprising the steps of:
a) mixing said dross residue with a calcium carbonate compound to produce a mixture;
b) heating said mixture, above a melting temperature of calcium aluminate in a furnace, and maintaining said mixture in liquid state long enough to achieve the following:
  i) complete oxidation of said Al and AlN present in said dross residue and reaction with any free CaO to form a calcium aluminate product;
  ii) evaporation of volatile alkali halide salts and/or sulfur products to obtain an enriched liquid calcium aluminate;
c) pouring said liquid calcium aluminate outside said furnace; and
d) letting said liquid calcium aluminate solidify to achieve a purified calcium aluminate product, essentially free from alkali halide salt, sulfur product and heavy metal oxide;

wherein said pre-melted purified calcium aluminate product is stable and suitable for use in purification and treatment of liquid iron and steel.

In a particular aspect of the invention, the process as described herein further comprises step:
b') decanting the heavy metal oxides present in the NMP to obtain a substantially purified liquid calcium aluminate.

Ratio

Particularly, in accordance with the process as defined herein, there is provided a process wherein in step a) the dross residue is mixed with said calcium carbonate compound in a proportion of $NMP/CaCO_3$ between about 0.3 to about 1 by weight; particularly to achieve an A/C ratio of between about 0.5 to about 1.8; more particularly an A/C ratio of between about 0.6 to about 1.6; most particularly, the eutectic A/C ratio of about 1.

Atmosphere

In accordance with a particular embodiment of the process as defined herein, step b) comprises heating under oxidizing atmosphere. Particularly, the oxidizing atmosphere is air and/or $CO_2$.

Temperature

Particularly, in accordance with the process as defined herein, there is provided a process, wherein in step b) the mixture is held under liquid state at temperature between about 1400° C. to about 1800° C.; more particularly between about 1400° C. to about 1700° C.

Contaminants

In accordance with a particular embodiment of the process as defined herein is directed to the conversion of a non-metallic aluminum dross residue contaminated by alkali and/or alkaline earth halide salt, (such as for example LiCl, NaCl, KCl, $MgCl_2$, $CaCl_2$, $SrCl_2$, LiF, NaF, KF) and $AlF_3$. In addition, the contaminating sulfur product may be recuperated through during evaporation in step ii) as condensed solid particulates in an off-gases treatment unit.

In accordance with a particular embodiment of the process may further comprise decantation in step b) for separating the heavy metal oxide under the form of liquid metal alloy and provides for periodically withdrawing the decanted liquid metal alloy from the furnace during step c). Such heavy metal oxide may be: $Fe_2O_3$, $TiO_2$, $V_2O_5$, MnO, $Cr_2O_3$ and/or $SiO_2$. In addition, the process may further comprise the addition in step a) or b) of a small quantity of metal or metal oxide easily reduced to the metallic state (such as iron or iron oxide), to favor the reduction and the separation by decantation of heavy metal oxides mentioned in step b').

Aluminum and NMP Origin

Particularly, in accordance with the process as defined herein, there is provided a process wherein the dross and the dross NMP originate from primary or secondary aluminum production and/or recycling operations.

Granulometry

Particularly, in accordance with the process as defined herein, there is provided a process as defined herein, wherein in step a), the non-metallic aluminum dross residue and calcium carbonate are of similar granulometry when mixed to produce a solid mixture. Particularly, the granulometry ranges from about 0.05 to about 5 mm; particularly from about 0.1 mm to about 3 mm.

Furnace

In accordance with the present invention, there is provided a process as defined herein, wherein in step b), the melting may be carried out in a gas or an electric furnace, more particularly in an electric furnace. Particularly, in step b), the solid mixture is heated using electric transferred arc or plasma technology. According to a particular embodiment, the process is performed in a metallurgical vessel comprising a steel shell water cooled from the exterior and a thin and conductive layer of dense refractory material inside to allow the formation of a thick and insulating frozen layer of slag material; particularly a Higgins type or equivalent furnace design, such as for example, a tilt-pour Higgins-type furnace. Batch Particularly, the process as defined herein may be carried out in separate batches or continuously.

Particular Embodiments

In accordance with the present invention, there is provided a process for the conversion of different types of non-metallic aluminum dross residues containing variable level of Al and AlN contaminated by varying levels of alkali and/or alkaline earth halide salts, into a substantially purified pre-melted calcium aluminate stable product essentially free from sodium halides, sulfides and heavy metals oxides, such as $Fe_2O_3$, $TiO_2$, $V_2O_5$, MnO, $Cr_2O_3$, suitable for the purification and the treatment of liquid iron and steel, comprising the steps of:
 a) mixing the dross residue originating from primary or secondary aluminum dross recycling operations with calcium carbonate compounds in proportion depending on the desired final ratio of alumina to calcium oxide in the final liquid calcium aluminate; (usually around the eutectic A/C ratio of 1, particularly varying between 0.5 and 1.8 by weight);
 b) heating the solid mixture under oxidizing conditions (air and/or $CO_2$) above the melting range of the final product using electrical means, (particularly with transferred arc or plasma technology), and holding under liquid state at temperature between 1400-1800° C.; (depending on the ratio of alumina to calcium oxide), to achieve the following:
  i) complete oxidation of the Al and AlN compounds present in the dross residue to form alumina and reaction with any free CaO to form calcium aluminate product;
  ii) essentially evaporate the volatile alkali and alkaline earth halide salts (like LiCl, NaCl, KCl, $MgCl_2$, $CaCl_2$, $SrCl_2$, LiF, NaF and KF) and sulfur products (which are recuperated as condensed solid particulates in the off-gases treatment unit) to obtain an enriched liquid calcium aluminate;
 b') separating by decantation a liquid ferrous mixed alloy containing essentially at least one of: Fe, Si, Ti, Mn, V, or Cr to achieve a significant reduction of the heavy metals oxides in the liquid calcium aluminate to obtain a decanted liquid ferrous mixed alloy and a substantially purified liquid calcium aluminate;
 c) pouring the decanted substantially purified liquid calcium aluminate and letting solidify outside the furnace; and;
 d) optionally, periodically withdrawing the decanted liquid ferrous mixed alloy from the furnace and letting solidify outside the furnace.

The process of the present invention provides the use a wide range of non-metallic residue (NMP, Non-Metallic Product) originating either directly from primary salt free dross processing operations, or from the salt separation plant of saltcake residue generated by salt based dross recycling furnace, or a mixture of both types of NMP, as alumina precursors for the preparation of molten calcium aluminate.

As is well known in the art, the chemical composition of dross residue varies greatly according to the process that produces the dross (primary, secondary, or recycling process), and the technologies used to recover aluminum from the dross.

Moreover, even if the plasma process does not require fluorinated or chlorinated additives for the treatment of primary dross, adding a given amount of chlorinated or fluorinated salts is indeed recommended for the treatment of secondary dross, in concentrations up to 5-6% to improve aluminum recovery, as described in U.S. Pat. No. 5,470,376.

In the case of dross treatment processes using liquid salt baths, the resulting residues consist of NMP and salt mixtures, referred to as "salt cakes". These residues must therefore be treated to separate the salts from the NMP. Even then, the NMP resulting from successive water washing and separation steps could still contain high levels of residual sodium, aluminum and calcium fluorinated salts, since these compounds have low or none water-solubility as opposed to chlorinated alkaline salts.

Despite many attempts to develop ways to extract alumina contents from NMP for the production of calcium aluminate for the steel industry, these approaches essentially apply to residues with low contaminant contents having already undergone purification and/or separation treatments, or stemming from selected dross with low contaminant levels.

An object of this invention is to expand the range of acceptable contaminants in order to tolerate a wide range of NMPs from various origins generated by the aluminum industry and to produce calcium aluminate for steel refining while bringing value to a residue that is considered damaging for the environment.

Also, another aspect of the process of the invention is to purify the aluminate obtained in liquid form to improve its value as a steel refining agent.

In addition to the different levels of chlorinated and fluorinated contaminants associated with different NMPs, they invariably contain significant levels of residual metallic aluminum and aluminum nitride (AlN) created by aluminum oxidation in air. These species are closely mixed with aluminum and magnesium oxides in the NMP, in varying quantities up to concentrations in the range of 15-30% for AlN and 5-20% for Al. NMPs also contain significant amounts of aluminum and magnesium oxides, as well as smaller quantities of oxides from the metals used in diverse aluminum alloys.

The typical NMP composition range within the framework of this invention is in fact relatively wide, as shown in TABLE 1.

TABLE 1

| Composition Range For NMP from Primary and Secondary Aluminum dross | | | | | | | | | | | | |
|---|---|---|---|---|---|---|---|---|---|---|---|---|
| | $Al_2O_3$ | Al | AlN | MgO | $Fe_2O_3$ | $SiO_2$ | MnO | $TiO_2$ | $Cr_2O_3$ | $Na_2O$ | Cl | F |
| Conc (%) | 50 | 12 | 20 | 10 | 2 | 4 | 1.0 | 1.5 | 0.10 | 5 | 2 | 4 |
| 1 sigma % | 15 | 5 | 3 | 5 | 1.0 | 2 | 0.5 | 1.0 | 0.05 | 3 | 1.5 | 4 |

It can be noted that, despite the presence of several contaminants in variable concentrations, NMPs are still a significant source of alumina as the alumina recovery potential following full oxidation of the residual nitrides and metallic aluminum approaches, and in some cases exceeds, 100% of the initial mass of the residue due to weight gain associated with Al and AlN oxidation.

Moreover, oxidation of these compounds in controlled conditions is a potentially significant source of thermal energy, a key element in the production of molten calcium aluminate.

It was soon observed that deriving a stable molten calcium aluminate product that could be used in an industrial setting for the treatment of steel was not possible when NMPs with high AlN and Al contents are made to react with a calcium and oxygen compound, especially calcium oxide, at high temperatures and in the treatment conditions described in the aforementioned patents, more precisely U.S. Pat. Nos. 5,135,165 and 5,385,601.

Chemical and crystallographic (XRD) analyses of the compounds obtained in these conditions revealed the formation of extremely reactive and sometimes pyrophoric metallic compounds made up of complex $Ca$—$Al_2$—$Si_{1.5}$ and $Al$—$Mg$—$Si$ alloys dispersed in the partially molten mineral matrix, containing a mixture of low-alumina phases as well as several highly reductive compounds made up of free CaO, residual AlN, and calcium and sodium hydrides (see details in Example 1).

Consequently, molten products formed in these conditions proved to be highly unstable, as they progressively degraded through hydration reaction in contact with ambient air, a well-known phenomenon occurring in calcium and magnesium oxide-based refractory materials. In some cases, powerful reactions can occur as a result of prolonged contact between these materials and air, giving the characteristic flames and explosions of pyrophoric materials.

However, it was surprisingly discovered that, when the same non-metallic products (NMPs) containing variable levels of Al and AlN were heated after mixing with calcium carbonate instead of calcium oxide, at the same high temperature (above 1400° C.) and in the same experimental conditions, perfectly stable calcium aluminate was reproducibly obtained.

Chemical and XRD analyses of products formed in these conditions confirmed the presence of the mayenite phase: $Ca_{12}Al_{14}O_{33}$ in major proportions, when mixture proportions approached a final $Al_2O_3$/CaO mass ratio of about 1, corresponding to the eutectic compound 12CaO-7$Al_2O_3$, and confirming the full oxidation of AlN and Al in these treatment conditions.

High carbon monoxide (CO) emissions were also surprisingly found to occur from the melting mass, causing strong agitation and active boiling of the solid-liquid mixture, and the complete fusion of the calcium aluminate a few minutes later. It seems that this reaction is regulated when the NMP and calcium carbonate materials with similar granulometries of 0.1-3 mm are well mixed in the solid state prior to melting. This type of granulometry also has the advantage of minimizing raw-material losses by the evacuation of fines through the reactor's exhaust system (flue).

In these conditions, carbon monoxide release is controlled as it burns above the melting load in contact with air, without projecting important quantities of solid or liquid particles. It was also noted that the agitation created by CO/$CO_2$ gas release produces many beneficial effects for the melting process and the quality of calcium aluminate formed in these conditions.

Indeed, the reaction time for the formation of calcium aluminate at temperatures in the range of 1400-1800° C. was very short, corresponding to residency times in the order of a few minutes, a phenomenon that is probably attributable (at least in part) to the physical agitation of the liquid slag caused by CO/$CO_2$ release.

Without wishing to be bound by theory or claiming to fully understand the overall physico-chemical mechanisms involved in these reactions, one can suppose that, under the current conditions, the oxidation of large quantities of AlN and Al in the NMP is not mainly the result of oxygen in the air, but rather by $CO_2$ reaction generated by the decomposition of calcium carbonate at high temperatures. The CO produced by this high-temperature reaction is oxidized by air as it leaves de reaction zone, all the while considerably accelerating the evaporation of volatile compounds in the liquid aluminate.

These observations resulting from the present invention are contradictory to prior art in which NMPs containing aluminum and aluminum nitride are said to be entirely oxidized and converted to liquid calcium aluminate by calcium oxide, even in an inert nitrogen or argon atmosphere.

Given that CO and $CO_2$ are released in the form of multiple small bubbles creating a significant contact interface between the gas and the liquid mass, one can expect that kinetic oxidation will be significantly increased with $CO_2$ rather than with oxygen in air where the contact interface between air and liquid slag is limited to the top surface area of the reactor. Moreover, given that the $CO_2$ generated by $CaCO_3$ decomposition ends up in its pure state, its reactivity is that much higher than that of the diluted $CO_2$ normally found in combustion products (fuels).

A series of chemical reactions can thus be written, illustrating the phenomena at play when contacting calcium carbonate with the Al, AlN, and $Al_2O_3$ contained in NMP:

$$CaCO_3 \rightarrow CaO + CO_2 \qquad\qquad \text{Eq.1}$$

$$3CO_2 + 2Al \rightarrow Al_2O_3 + 3CO \qquad\qquad \text{Eq.2}$$

$$3CO_2 + 2AlN \rightarrow Al_2O_3 + 3CO + N_2 \qquad\qquad \text{Eq.3}$$

$$2CO + O_2 \rightarrow 2CO_2 \qquad\qquad \text{Eq.4}$$

$$12CaO + 7Al_2O_3 \rightarrow Ca_{12}Al_{14}O_{33} \qquad\qquad \text{Eq.5}$$

Adding up reactions 1 to 5 in proportions that reproduce the typical NMP composition, such as illustrated in TABLE 1, leads to the following overall reaction:

$$48CaCO_3 + 14Al_2O_3 + 14Al + 14AlN + 21O_2 \rightarrow 4Ca_{12}Al_{14}O_{33} + 48CO_2 + 7N_2. \qquad \text{Eq.6}$$

It can be observed that the overall reaction, while entirety exact, hides the predominant role of carbon dioxide as the active agent for the oxidizing of aluminum and aluminum nitride when present in significant amounts in the NMP.

Based on the proposed mechanism, confirmed by thermodynamic computations of the enthalpy reaction using the FactSage™ thermochemical computation model, $CO_2$, and not oxygen in air, is responsible for the full conversion of residual Al and AlN reduction products in the NMP, in liquid phase at high temperature.

This phenomenon, surprising at first glance, also explains the inability to produce stable, usable aluminate products using the methodologies proposed in prior art, based on the use of compounds exclusively made up of calcium and oxygen, such as calcium oxide, in neutral atmosphere, as described at paragraph 53.

Purification Reaction of the Calcium Aluminate.

In the above description, the focus has been placed on the conversion on the non-metallic products present in the dross residues, specifically the alumina and the alumina precursors (Al and/or AlN), by their reaction with calcium carbonate for the production of calcium aluminate, under oxidizing environment.

In addition, this invention covers another aspect related to the quality improvement of the products, by which the chemical composition of the calcium aluminate is significantly improved due to the removal of undesirable impurities such as several oxides of metals that can be reduced to their metallic state by the aluminum and aluminum nitrides, as well as the removal of some volatile halides of alkali metals and sulfur compounds.

It was discovered during the course of experimentation with the present invention that this refining or purification is attributable to the combined presence and double action of 1) the strong reducing power of dispersed aluminum particulates and/or aluminum nitride within the liquid mineral calcium aluminate phase and 2) the boiling and stirring action attributable to the generation and evolution of the $CO/CO_2$ gas mixture also within the liquid phase.

Due to the highly reductive character of aluminum nitride and metallic aluminum dispersed in the form of fines, a large proportion of heavy metal oxides dissolved in liquid aluminate at high temperature ends up being reduced to liquid metal state and agglomerated in the form of liquid alloys that separate from the liquid aluminate by decanting and accumulate at the bottom of the reactor. Despite the fact that a relatively variable and low amount of alloy is produced, in the order of 1-5%, depending on the initial contaminant levels, the purity of the aluminate produced is thus greatly enhanced, making it possible to use NMPs with high impurity contents without affecting the quality of the calcium aluminate final product.

In some cases, depending on the nature and concentration of metallic impurities in the NMP, adding a given quantity of metal or its oxide to the NMP-calcium carbonate mixture is desirable in order to enhance the separation and decantation of the other oxides reduced in the form of a liquid alloy. For example, adding iron or iron oxide, increases the amount of silicon or manganese eliminated from the liquid aluminate. In such cases, adding this collector in the form of oxide that is easily reducible such as iron oxide also helps to accelerate the full oxidation of the NMP's aluminum and aluminum nitride, an essential condition to achieve a stable aluminate end product.

TABLE 2 shows the refining degree obtained by comparing the initial oxide levels of Fe, Si, Mn, Ti and Cr in NMP, and the final levels in calcium aluminate produced with an NC ratio of 1.

We also note from TABLE 2 results that some magnesium oxide is also reduced during the formation of the calcium aluminate, although to a lesser extent than the heavier metal oxides. Considering that several binary compounds can be formed in the $CaO—Al_2O_3$ system, the reduction of magnesium oxide by the aluminum may be described by several reactions, like the following, where the alumina produced is strongly bound with the calcium oxide:

$$3MgO + 2Al_{liq} + 3CaO \text{------} Ca_3Al_2O_6 + 3Mg_v \qquad \text{Eq. 7}$$

$$3MgO + 2Al_{liq} + CaO \text{------} CaAl_2O_4 + 3Mg_v \qquad \text{Eq. 8}$$

As a result, the calculated Gibbs energy for these reactions shows that for a temperature range superior to 1460° to 1520° C., the reduction of MgO by metallic aluminum present in the NMP is thermodynamically possible. Similarly, the AlN will also reduce the MgO, although at a slightly higher temperature range of about 1510 to 1550° C. This can explain that the reduction of the magnesium oxide is enhanced at higher slag temperature, with the formation of magnesium vapour which are rapidly oxidized to MgO in contact with the atmosphere. These MgO particulates are collected along with the other volatilized salts particulates and the dust captured by the exhaust dust collection system.

TABLE 2

PURIFICATION OF CALCIUM ALUMINATE BY
REDUCTION OF NMP METAL OXIDES
Level of oxides present (%)

| | MgO | $SiO_2$ | $Fe_2O_3$ | MnO | $TiO_2$ | $Cr_2O_3$ |
|---|---|---|---|---|---|---|
| NMP | 15 | 2.8 | 1.1 | 0.35 | 0.3 | 0.10 |
| Aluminate* | 5-3 | 1.6 | 0.15 | 0.05 | 0.06 | 0.01 |
| % removal | 35-60 | 48 | 77 | 70 | 60 | 80 |

*Measured for an $Al_2O_3/CaO$ ratio of 1. The aluminate was produced using CALCO ™ limestone (Graymont Co.) containing 53% CaO, 1.9% $SiO_2$, and 0.4% $Al_2O_3$.

As well, the calcium aluminate obtained in these conditions was noted to contain very low sodium and sulphur levels, below 0.1% Na and less than 0.01% S, attributable to the accelerated evaporation of alkaline salt fumes induced by $CO/CO_2$ release through the liquid aluminate load. These vaporized salt fumes solidify quickly during gas quenching from the reaction and are collected in the gas scrubbing system.

The metallurgical vessel to perform this invention under steady state, at industrial scale preferably has a steel shell water cooled from the exterior, lined with a thin and conductive layer of dense refractory material from the inside, to allow the formation of a thick and insulating frozen layer of the slag material, made of solid calcium aluminate in the case of this invention. This design prevents the risks of contamination, while confining the hot liquid slag in a safe manner. The design and the operation of such electric furnace design are well known in the fused mineral industries under the name of Higgins furnace.

The heating of such vessel to process dross residues into molten calcium aluminate is preferably done using electrical energy input for several reasons. First, considering the high temperature involved, the energy efficiency, the power density and the productivity of electrical technology cannot be matched by the combustion of fossil fuels. In addition, the absence of water vapor in the reactor eliminates the risks of chemical reaction by pyrohydrolysis at high temperature responsible for the formation of acid halogenated compounds, such as HCl and HF with the salts present in the NMP residues. Another advantage of electrical heating system is related to the low volume of gas in circulation through the reaction vessel, thus contributing to minimize the fine solid particulates entrainment, and greatly simplifying the size and the operating costs of the exhaust gas cleaning installations.

Several industrial proven technologies are well suited for the production of melted calcium aluminate at very high temperature, capable of operating under air atmosphere as required by the present invention. A large number of electric arc or plasma heating devices, used either in the transferred or non-transferred mode, AC or DC are available. For the present invention, heating devices based on direct and indirect carbon arc, operated in AC and DC mode have been successfully utilized. Plasma heating technology, using DC transferred arc has also been used with success.

Extensive review of the possible technology type and of their different possible combination have been published recently, such as: *Topical Review entitled: Thermal Plasma Waste Treatment by J. Heberlein and A. B. Murphy, published in J. Phys. D: Applied Physics* 41 (2008) 053001 (20 pp) or in the following publication: *New Trends in submerged Arc Furnace Technology by J. Kunze and R. Degel, ISBN:* 0-9584663-5-1.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLE 1

A NMP residue originating from smelter dross processed by the plasma dross recycling technology containing 12% Al, 21% AlN, 85% total $Al_2O_3$ (after oxidation of Al and AlN), 11.5% MgO, 4.6% $SiO_2$, 0.4% $Fe_2O_3$, 2.3% total sodium as $Na_2O$, 2.5% total F, was mixed with anhydrous lime (CaO) in proportion to meet a A/C ratio (A=$Al_2O_3$, C=CaO) of 1 and heated in a clay graphite crucible using a 10 kW indirect carbon arc electrical furnace under air atmosphere. The liquid product was maintained at a temperature range between 1500-1600° C. for several minutes (2-5), before pouring and cooling under air atmosphere. The analysis of the solidified product using XRD for mineral phases identification and XRF for chemical composition reveal a mixture of calcium aluminate phases, such as C12A7 (eutectic) and C3A (CaO rich) mixed with unreacted residual CaO, AlN, and Ca—Al—Si ($CaAl_2Si_{1.5}$), metallic inclusions. These metallic inclusions were very reactive (pyrophoric) in presence of humidity. The LOI at 1050° C. was negative (corresponding to a weight gain) between 2-4%. This solid product gradually reacted under air atmosphere and was completely transformed to fine dust material after a few weeks. The XRD analysis of the decomposed fine powder showed the presence of $Ca(OH)_2$, CaH, NaH, and AlN. Identical results were obtained using different types of dross residues of similar composition when processed with lime (results not shown).

EXAMPLE 2

A NMP residue of similar composition as Example 1 was mixed with limestone using Graymont Co CALCO™ $CaCO_3$ product (see FIGS. 1-4), (equivalent to 54% CaO), in proportion to get a final A/C weight ratio of 1. The heating and the processing (time, temperature) was carried out using identical equipment and procedure as described in EXAMPLE 1. Contrarily to the products obtained under EXAMPLE 1, the solidified product obtain after cooling the liquid product was inert and stable under air, with a LOI varying between +0.5% and −0.5% The XRD analysis confirms the presence of the C12A7eutectic phase as the major phase. No evidence of non-reacted original mineral phases (such as CaO, Al or AlN) or metallic inclusions was detected. The chemical analyses reveal low level of Na, less than 0.1%, low sulfur and chloride levels less than 0.01%, and less than 1% total F. This material gave very satisfactory results for sulfur removal and slag conditioning when utilized for ladle metallurgy treatment of high quality steel.

EXAMPLE 3

7.5 kg of NMP containing high level of sodium and fluoride contaminants as indicated below was mixed with limestone granular material (3-6 mm) from Graymont Co. in proportion of about 1.7 part of limestone with 1 part of NMP to obtain a final ratio of A/C of 1. The mixture was melted in several batches of 1-2 kg using a DC direct arc furnace with graphite electrode in a SiC/graphite crucible, at power between 10-15 kW, operating under air atmosphere. CO gas was generated during the reaction and burned spontaneously above the melt. The liquefied product was heated between 1550-1800° C., and held for a few minutes before pouring into a steel mold. Fine dust generated during the operation was collected in a dust collector. About 420 g of fine particulate material was obtained after the tests, equivalent to about 3% of the final product. The dust material contains entrained fine material of limestone, NMP, with a mixture of MgO, sodium chloride, potassium chloride, sodium fluoride, calcium fluoride, silica and others traces of compounds volatilized during the fusion process. XRD analysis of the solidified calcium aluminate product confirmed the presence of Mayenite or $12CaO.7Al_2O_3$ as the main constituent. Small residual level of fluoride in the calcium aluminate was detected as $Ca_{12}Al_{14}F_2O_{32}$ in concentration of about 1%. The residual level of total sodium was consistently below 0.1%, expressed as $Na_2O$, Small quantities of solidified ferro-silicon alloy granules containing low levels of Ti, Mn, V, Cr, were collected in the bottom of the crucible furnace, confirming the reduction of metal oxides present in the NMP by the aluminum.

The chemical composition of the NMP and of the calcium aluminate was measured as follows:

| % LEVEL OF: | $Al_2O_3$ | Al | AlN | CaO | MgO | $SiO_2$ | $Fe_2O_3$ | MnO | $TiO_2$ | $Cr_2O_3$ | $Na_2O$ | F |
|---|---|---|---|---|---|---|---|---|---|---|---|---|
| NMP | 40-45 | 11-15 | 21 | 1.8 | 6.0 | 5.2 | 1.0 | 0.3 | 0.3 | 0.03 | 6.5 | 7.0 |
| Ca Aluminate | 44-47 | 0 | 0 | 45-48 | 2.5-3.0 | 0.4-0.5 | 0.1-0.2 | 0.03 | 0.05 | less 0.01 | less 0.1 | 1.5 |

Figure 5:
FIG. 5 shows the solidified calcium aluminate product.

The calcium aluminate was dense (specific gravity of 3 g/cm³), inert, non-dusty. TCLP testing confirmed that the product is environmentally stable and meets the EPA regulations for metals and fluoride (FIG. 5).

EXAMPLE 4

NMP loads of composition similar to EXAMPLE 1 and 3 were mixed in large batches with limestone in a proportion varying between 1 part NMP to 1.6-1.8 parts limestone to obtain a final A/C ratio of 1. The blended solid mixture was continuously added to a plasma furnace, at the rate between 1,300 to 2,000 lbs/hr, corresponding to a liquid calcium aluminate output of approximately 1,000 to 1,500 lbs/hr. The transferred plasma arc was operated at power varying between 1.1 to 1.4 MW. Liquid calcium aluminate was continuously poured from the furnace at a temperature varying between 1500 and 1800° C., and continuously solidified. Periodically, liquid ferrosilicon alloy, containing variable concentration of Mn, Ti, V, Cr coming from the NMP was withdrawn from the bottom of the furnace. Carbon monoxide gas was burned in air before dilution and filtration of the exhaust furnace gases. The product obtained consisted essentially of the eutectic calcium aluminate 12C7A, characterized by its low melting point and high purity, with an average level of MgO (3-5%), $SiO_2$ (1-2%), $Fe_2O_3$ (0.1-0.2%), $TiO_2$ (0.02-0.05%), Na (0.02-0.04%), F (less 1%), Sulfur (0.01%), LOI (−0.2 to −0.4%). This product was very stable, inert and non-dusty, and gave excellent performance results when utilized for different iron and steel treatments.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. All such modifications are intended to be included within the scope of the appended claims.

All publications and patent applications cited in this specification are herein incorporated by reference as if each individual publication or patent application were specifically and individually indicated to be incorporated by reference.

REFERENCES

Recycling of Metals and Engineered Materials, TMS, pp. 1, 183, (2000);
Topical Review: Thermal Plasma Waste Treatment by J. Heberlein and A. B. Murphy, published in J. Phys. D: Applied Physics 41 (2008) 053001 (20 pp);
New Trends in submerged Arc Furnace Technology by J. Kunze and R. Degel, ISBN: 0-9584663-5-1.

I claim:

1. A process for the conversion of a non-metallic aluminum dross residue containing variable level of aluminum (Al) and aluminum nitride (AlN) contaminated by at least one of: an alkali or alkaline earth halide salt, a sulfur product and/or a heavy metal oxide, into a pre-melted substantially purified calcium aluminate product, the process comprising the steps of:
  a) mixing said dross residue with a calcium carbonate compound to produce a mixture;
  b) heating said mixture in a furnace, under oxidizing conditions above a melting temperature of calcium aluminate, and maintaining said mixture in liquid state long enough to achieve the following:
    i) substantially complete oxidation of said Al and AlN present in said dross residue, and substantially complete reaction with any free CaO to form a calcium aluminate product;
    ii) substantial evaporation of volatile alkali and/or alkaline earth halide salt and/or sulfur product to obtain an enriched liquid calcium aluminate;
  c) discharging said enriched liquid calcium aluminate outside said furnace; and
  d) letting said liquid calcium aluminate solidify to achieve a pre-melted substantially purified calcium aluminate product, essentially free from alkali halide salt and/or sulfur product and/or heavy metal oxide;

wherein said pre-melted substantially purified calcium aluminate product is stable and suitable for use in purification and treatment of liquid iron and steel.

2. The process of claim 1, wherein in step b) further comprises:
  b') separating by decantation said enriched liquid calcium aluminate containing a heavy metal oxide to achieve a significant reduction of said heavy metal oxide in said liquid calcium aluminate and separate out a decanted liquid ferrous mixed alloy.

3. The process of claim 1, wherein in step a) said dross residue is mixed with said calcium carbonate compound in a proportion of between about 0.3:1 to about 1:1 by weight.

4. The process of claim 1, wherein in step a) said dross residue is mixed with said calcium carbonate compound in proportion of an A/C ratio of between about 0.5:1 to about 1.8:1 by weight.

5. The process of claim 4, wherein in step a) said dross residue is mixed with said calcium carbonate compound in proportion of an eutectic A/C ratio of about 1:1 (w/w).

6. The process of claim 1, wherein in step b), said oxidizing atmosphere is air.

7. The process of claim 1, wherein in step b), said oxidizing atmosphere is $CO_2$.

8. The process of claim 1, wherein in step b), said melting is carried out using electricity.

9. The process of claim 8, wherein in step b), said solid mixture is heated using transferred arc or plasma technology.

10. The process of claim 1, wherein in step b) said mixture is held under liquid state at temperature between about 1400° C. to about 1800° C.

11. The process of claim 1, wherein said volatile alkali or alkaline earth halide salt is selected from: LiCl, NaCl, KCl, $MgCl_2$, $CaCl_2$, $SrCl_2$, LiF, NaF and KF.

12. The process of claim 1, further comprising the step of: recovering said volatile salt and product evaporated in step ii) as condensed solid particulates in an off-gases treatment unit.

13. The process of claim 1, wherein said heavy metal oxide is selected from the group consisting of: $Fe_2O_3$, $TiO_2$, $V_2O_5$, MnO, $Cr_2O_3$ and $SiO_2$.

14. The process of claim 2, further comprising the step of periodically withdrawing said decanted liquid metal alloy from said furnace during step b').

15. The process of claim 1, wherein said dross originates from primary or secondary aluminum recycling operations.

16. The process of claim 2, wherein in step a), a small quantity of metal or metal oxide is further added in order to improve and/or facilitate separation and decantation of said heavy metal oxide mentioned in step b').

17. The process of claim 16, wherein said metal or metal oxide is iron or iron oxide.

18. The process of claim 8, being performed in an electric furnace.

19. The process of claim 18, being performed in a metallurgical vessel comprising a steel shell water cooled from the exterior and a thin and conductive layer of dense refractory material inside to allow the formation of a thick and insulating frozen layer of slag material.

20. The process of claim 19, wherein said furnace is a Higgins-type furnace.

21. The process of claim 20, wherein said furnace is a tilt-pour Higgins-type furnace.

22. The process of claim 1 or 2 being carried out in batch or continuously.

* * * * *